United States Patent
Hosokawa (10) Patent No.: US 6,606,024 B1
(45) Date of Patent: *Aug. 12, 2003

(54) ELECTRONIC AUTHENTICATION METHOD AND SYSTEM THEREFOR

(75) Inventor: Hiroshi Hosokawa, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/886,410

(22) Filed: Jul. 1, 1997

(30) Foreign Application Priority Data

Jul. 9, 1996 (JP) .............................. 8-196914

(51) Int. Cl.$^7$ ................................. H04Q 9/00
(52) U.S. Cl. ................. 340/5.8; 340/5.85; 713/168; 713/172; 713/201; 713/202; 713/155; 709/229
(58) Field of Search .............................. 340/825.34, 5.8, 340/5.85; 395/186, 187.01, 188.01; 380/4, 23, 25; 713/201, 202, 172, 185, 168; 709/229

(56) References Cited

U.S. PATENT DOCUMENTS

| | | | | |
|---|---|---|---|---|
| H510 | H | * | 8/1988 | Clinch .................... 713/168 |
| 4,928,098 | A | * | 5/1990 | Dannhaeuser .............. 340/5.26 |
| 5,293,576 | A | * | 3/1994 | Mihm, Jr. et al. ............. 380/25 |
| 5,560,008 | A | * | 9/1996 | Johnson et al. ............. 713/201 |
| 5,646,998 | A | * | 7/1997 | Stambler .................... 713/185 |
| 5,757,916 | A | * | 5/1998 | MacDoran et al. ........... 380/25 |
| 5,761,309 | A | * | 6/1998 | Ohashi et al. ................ 380/25 |
| 5,764,890 | A | * | 6/1998 | Glasser et al. .............. 713/202 |

* cited by examiner

*Primary Examiner*—Michael Horabik
*Assistant Examiner*—Yves Dalencourt
(74) *Attorney, Agent, or Firm*—Fitzpatrick, Cella, Harper & Scinto (57) ABSTRACT

An information source connected to a user's terminal through a communication line sends authentication information to the user's terminal. The user's terminal sends back response information of a card which is unique to each owner and which is loaded into the user's terminal, to the information source. The information source verifies the response information of the card to positively authenticate the user of the card.

30 Claims, 8 Drawing Sheets

ELECTRONIC AUTHENTICATION METHOD AND SYSTEM THEREFOR

BACKGROUND OF THE INVENTION

1. Field of the Invention

The present invention relates to an electronic authentication method for authenticating the user of a communication line and a system therefor.

2. Description of the Related Art

Ciphering key methods have been widely used for authenticating the user of a communication line. Well known ciphering key methods include private key methods such as the Data Encryption Standard (DES), Fastdata Encipherment Algorithm (FEAL), RC-2, RC-4, and RC-5 methods, and public key methods such as the Rivest Shamir Adleman (RSA) method. The Secure Socket Layer (SSL) method, which performs encryption at a certain layer in a communication protocol, is also well known. In addition to these methods, which encrypt transmission information, a method has been proposed in which authentication is performed by sending specified information or random-number information from a physical information medium unique to the user, such as a memory card.

In the conventional methods described above, encryption/response communication of information required for authentication may be monitored and decrypted by a third party. Therefore, authentication of the specified user cannot be positively performed.

SUMMARY OF THE INVENTION

The present invention is made in order to solve the above-described problems in the conventional methods. Accordingly, it is an object of the present invention to provide an electronic authentication method which can positively authenticate the specified user even if communicated information is monitored by a third party and authentication information/response information/a response method is decrypted, and a system therefor.

The foregoing objects are achieved according to one aspect of the present invention through the provision of an electronic authentication method including the steps of: (1) inputting information sent from an information source connected to a user's terminal through a communication line into a physical information medium unique to each owner; (2) sending response information output from the information medium to the information source; and (3) verifying the response information output from the information medium in the information source.

The foregoing objects are also achieved according to another aspect of the present invention through the provision of an electronic authentication method including the steps of: (1) inputting information sent from an authentication source required to perform authentication by an information source connected to a user's terminal through a communication line into a physical information medium unique to each owner; (2) sending response information output from the information medium to the authentication source; and (3) verifying the response information output from the information medium in the authentication source.

The foregoing objects are also achieved according to still another aspect of the present invention through the provision of an electronic authentication system including: (1) an information source connected to a user's terminal through a communication line; and (2) a physical information medium which is unique to each owner and to which information sent from the information source is input; (3) wherein response information output from the information medium is sent to the information source; and (4) the response information output from the information medium is verified in the information source for authentication.

The foregoing objects are also achieved according to yet another aspect of the present invention through the provision of an electronic authentication system including: (1) an information source connected to a user's terminal through a communication line; (2) a physical information medium which is unique to each owner and to which information sent from the information source is input; and (3) an authentication source connected to the user's terminal and the information source through communication means, wherein (4) response information output from the information medium is sent to the authentication source and is verified for authentication.

The foregoing objects are also achieved according to a further aspect of the present invention through the provision of an electronic authentication method including: (1) a first sending step for sending authentication information from an information source terminal to a user's terminal; (2) an input step for inputting the authentication information received by the user's terminal into an information medium loaded to the user's terminal; (3) a calling step for calling response information from the information medium to the user's terminal according to the previously input authentication information; (4) a second sending step for sending the response information from the user's terminal to the information source terminal; (5) a determination step for determining whether the response information received by the information source terminal is valid according to a correspondence table of authentication information stored in storage means of the information source terminal and the response information; and (6) a decision step for deciding according to the result of the determination whether the information source terminal permits access from the user's terminal.

The foregoing objects are also achieved according to a still further aspect of the present invention through the provision of an electronic authentication method including: (1) a first sending step for sending authentication-request information for a user's terminal from an information source terminal to an authentication terminal; (2) a second sending step for sending authentication information from the authentication terminal to the user's terminal; (3) an input step for inputting the authentication information received by the user's terminal into an information medium loaded into the user's terminal; (4) a calling step for calling response information from the information medium to the user's terminal according to the previously input authentication information; (5) a third sending step for sending the response information from the user's terminal to the authentication terminal; (6) a determination step for determining whether the response information received by the authentication terminal is valid according to a correspondence table of authentication information stored in storage means of the authentication terminal and the response information; (7) a fourth sending step for sending the result of the determination from the authentication terminal to the information source terminal; and (8) a decision step for deciding according to the result of the determination whether the information source terminal permits access from the user's terminal.

The foregoing objects are also achieved according to yet a further aspect of the present invention through the provision of an electronic authentication system including an information source terminal and a user's terminal, the information source terminal including: (1) a first sending unit for sending authentication information to the user's terminal; (2) a storage unit for storing a correspondence table of authentication information and response information; (3) a determination unit for determining whether the response information received from the user's terminal is valid according to the correspondence table; and (4) a decision unit for deciding whether access from the user's terminal is permitted according to the result of the determination, and the user's terminal including: (1) a loading unit for loading an information medium; (2) an input unit for inputting the authentication information into an information medium loaded into the loading means; and (3) a second sending unit for sending response information called according to the authentication information input from the information medium, to the information source terminal.

The foregoing objects are also achieved according to an additional aspect of the present invention through the provision of an electronic authentication system including an information source terminal, a user's terminal, and an authentication terminal, the information source terminal including: (1) a first sending unit for sending authentication-request information for the user's terminal to the authentication terminal; and (2) a decision unit for deciding whether the information source terminal permits access from the user's terminal according to the result of the determination of whether the response information of the user's terminal received from the authentication terminal is valid, the authentication terminal including: (1) a second sending unit for sending authentication information to the user's terminal; (2) storage means for storing a correspondence table of authentication information and response information; (3) a determination unit for determining whether the response information received from the user's terminal is valid according to the correspondence table; and (4) a third sending unit for sending the result of the determination to the information source terminal, and the user's terminal including: (1) a loading unit for loading an information medium; (2) an input unit for inputting the authentication information into an information medium loaded into the loading means; and (3) a fourth sending unit for sending response information called according to the authentication information input from the information medium, to the authentication terminal.

The foregoing objects are also achieved according to a still additional aspect of the present invention through the provision of a storage medium storing a program for executing, in a computer, the steps including: (1) sending authentication information from an information source terminal to a user's terminal; (2) inputting the authentication information received by the user's terminal into an information medium loaded to the user's terminal; (3) calling response information from the information medium to the user's terminal according to the previously input authentication information; (4) sending the response information from the user's terminal to the information source terminal; (5) determining whether the response information received by the information source terminal is valid according to a correspondence table of authentication information stored in storage means of the information source terminal and the response information; and (6) deciding according to the result of the determination whether the information source terminal permits access from the user's terminal.

The foregoing objects are also achieved according to yet an additional aspect of the present invention through the provision of a storage medium storing a program for executing, in a computer, the steps including: (1) sending authentication-request information for a user's terminal from an information source terminal to an authentication terminal; (2) sending authentication information from the authentication terminal to the user's terminal; (3) inputting the authentication information received by the user's terminal into an information medium loaded to the user's terminal; (4) calling response information from the information medium to the user's terminal according to the previously input authentication information; (5) sending the response information from the user's terminal to the authentication terminal; (6) determining whether the response information received by the authentication terminal is valid according to a correspondence table of authentication information stored in storage means of the authentication terminal and the response information; (7) sending the result of the determination from the authentication terminal to the information source terminal; and (8) deciding according to the result of the determination whether the information source terminal permits access from the user's terminal.

DESCRIPTION OF THE PREFERRED EMBODIMENTS

Embodiments of the present invention will be described below by referring to the drawings.

First Embodiment

Figure 1:
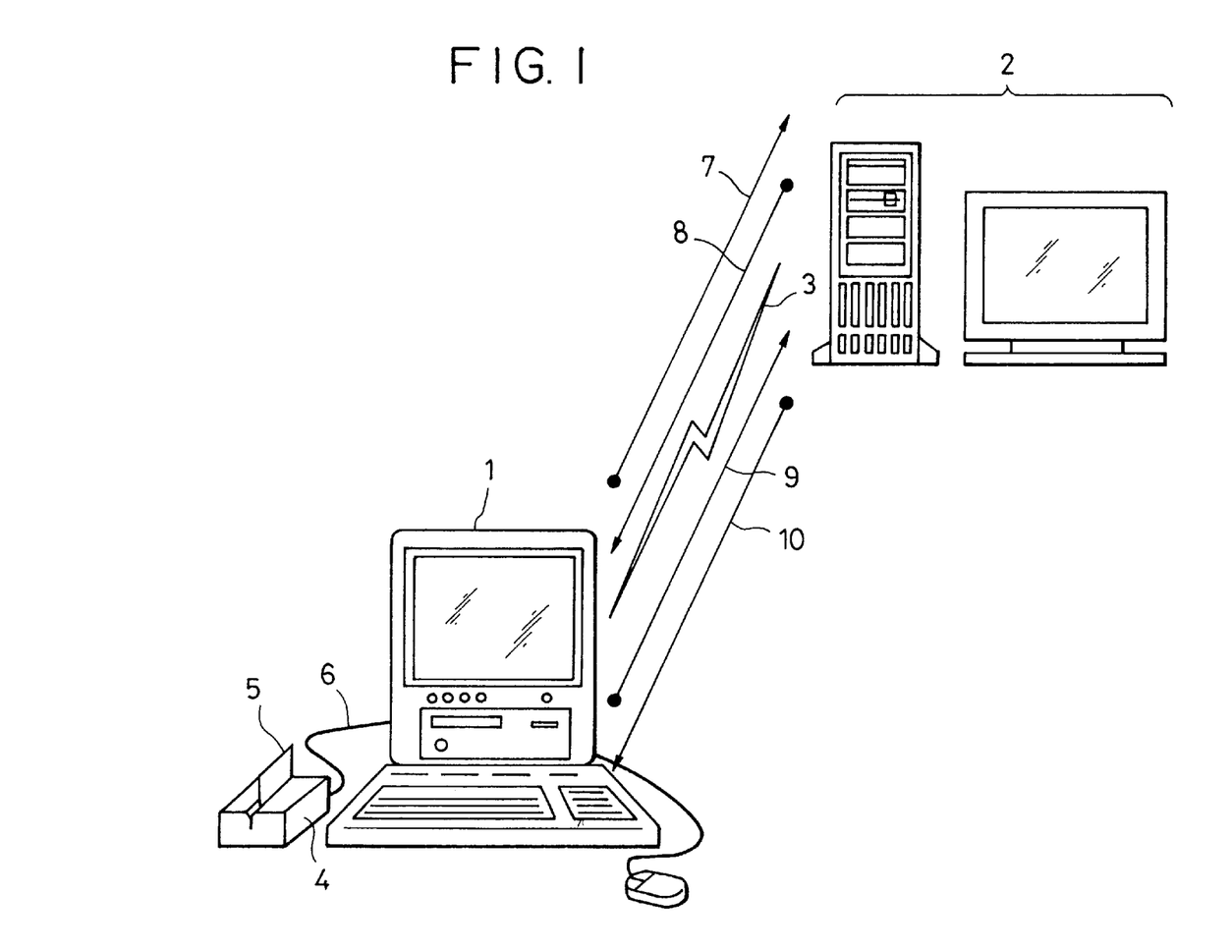
FIG. 1 is a view showing a configuration of an authentication system according to a first embodiment of the present invention.

A first embodiment of the present invention will be described first by referring to FIGS. 1 to 3. FIG. 1 shows a configuration of an authentication system according to the first embodiment of the present invention. In FIG. 1, there is shown a personal computer (hereinafter called a terminal) 1 serving as a user's information processing unit, an information source 2 connected to the user's terminal 1 through a communication line 3, a card reader 4, a user's card 5 (information medium), a connection cable 6 connecting the user's terminal 1 to the card reader 4, communication-request information 7 of the user which is sent from the user's terminal 1 to the information source 2, authentication information 8 sent from the information source 2 to the user's terminal 1, response information 9 sent from the card 5 to the information source 2 through the user's terminal 1, and communication-permission information 10 (usage-permission information) sent from the information source 2 to the user's terminal 1.

When the user performs communication from the terminal 1 to the information source 2 through the communication line 3 in FIG. 1, the user sends the communication-request information 7 from the user's terminal 1 to the information source 2. Immediately after the information source 2 receives the communication-request information 7 sent from the user's terminal 1, the information source 2 sends the authentication information 8 to the user's terminal 1. When the user's terminal 1 receives the authentication information 8, the authentication information 8 is transferred to the card reader 4 connected to the user's terminal 1 through the connection cable 6. When the user's card 5 is loaded into the card reader 4, specified response information 9 corresponding to the input authentication information 8 is sent from the card 5 to the information source 2 through the user's terminal 1. Assume that the response information 9 generated by the card 5 in response to the input authentication information 8 is unique to the user's card 5. The information source 2 verifies the input response information 9. Immediately after the user is authenticated, the information source 2 sends the communication-permission information 10 to the user's terminal 1. Thereby, communication between the user's terminal 1 and the information source 2 is permitted. Since after the authentication, the authentication information 8 sent from the information source 2 to the user's terminal 1 becomes unnecessary, free communication is performed between the user's terminal 1 and the information source 2.

Figure 2:
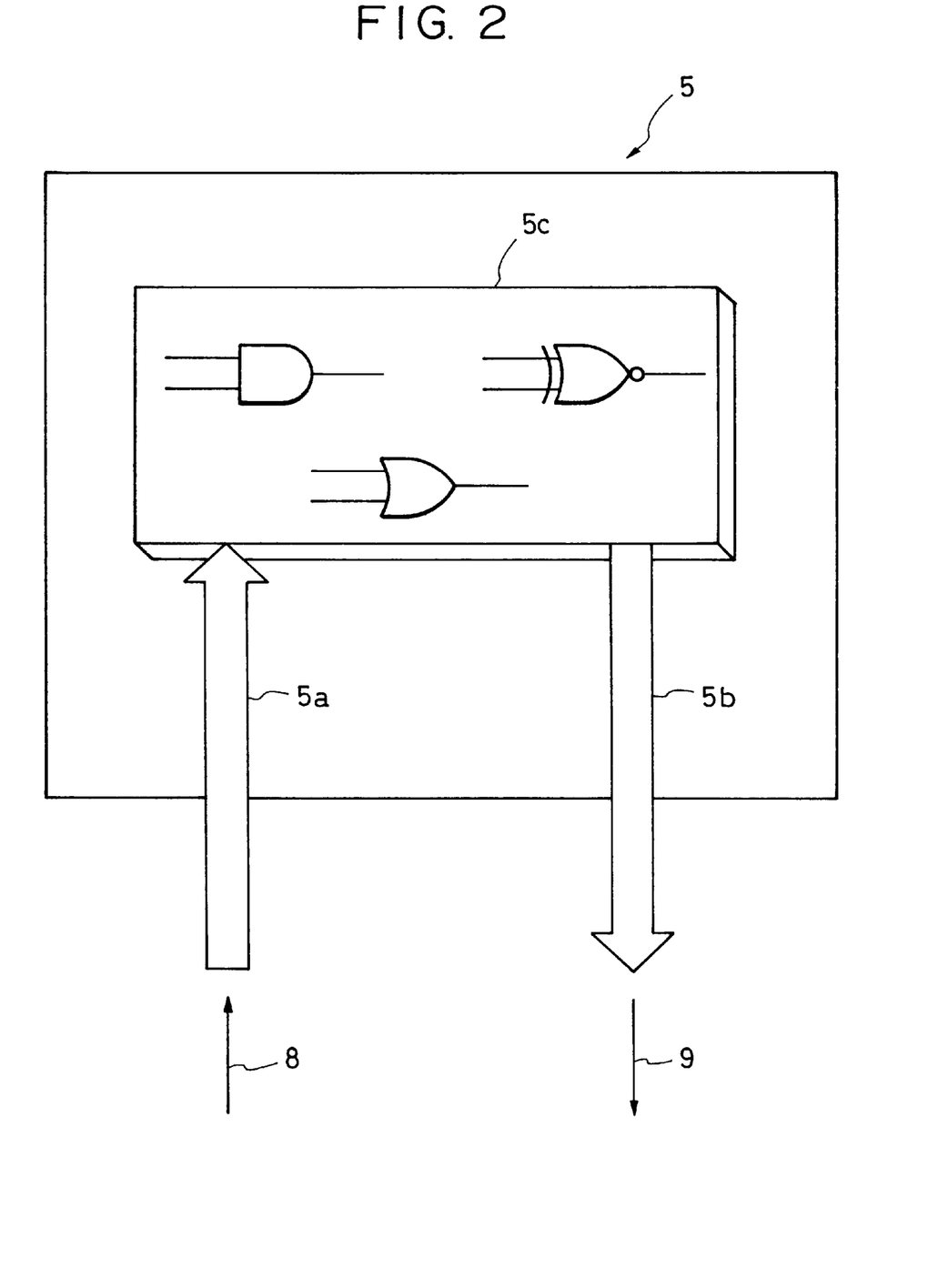
FIG. 2 is a block diagram showing an internal configuration of a card used for the authentication system.

FIG. 2 is a block diagram illustrating an internal configuration of the user's card 5 used for the authentication system according to the present embodiment. In FIG. 2, the authentication information 8 input from an input port 5*a* is logically calculated in a conversion circuit 5*c* and is output from an output port 5*b* as the response information 9. As the authentication information 8 changes, the response information 9 changes accordingly.

Figure 3:
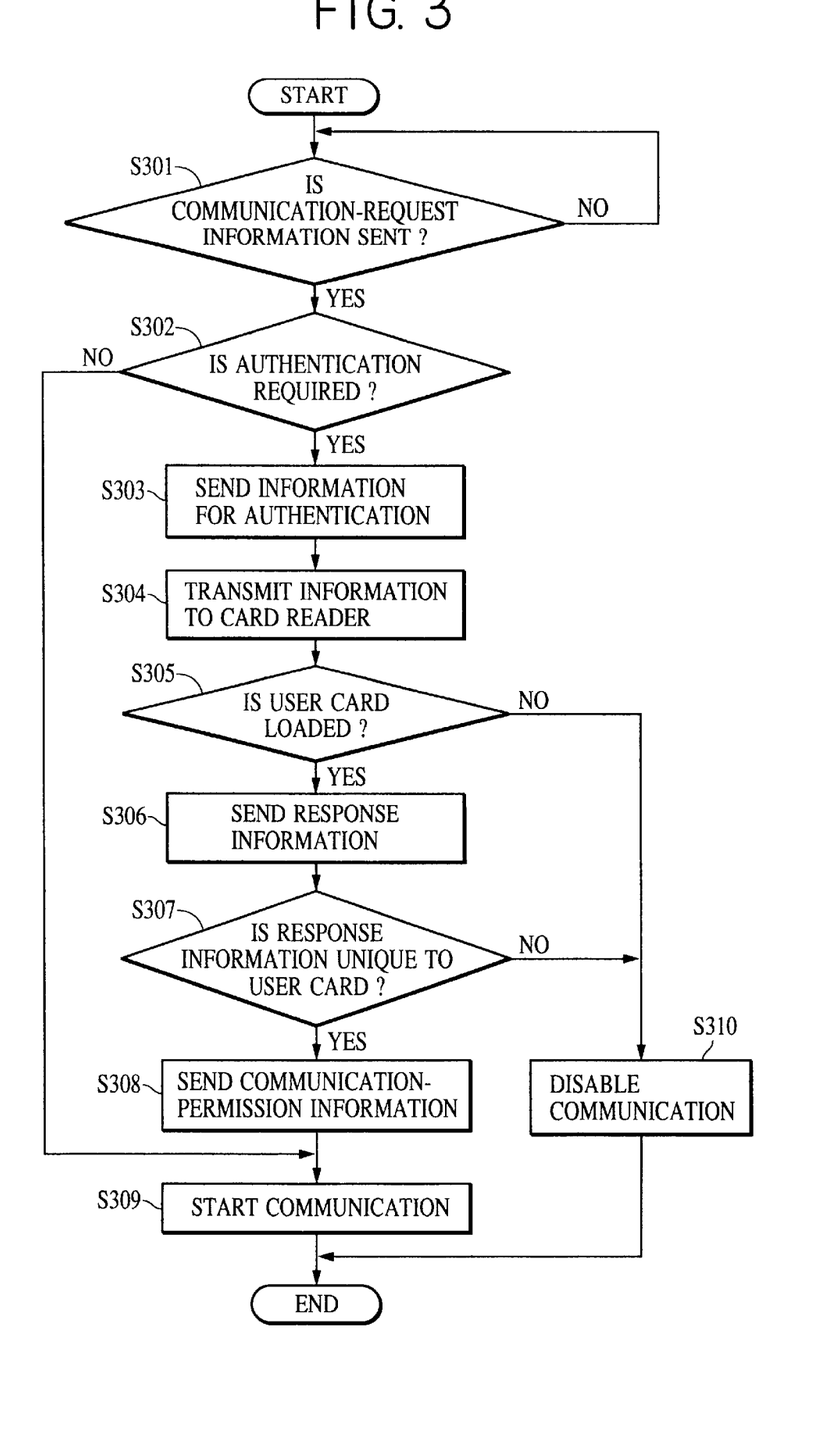
FIG. 3 is a flowchart illustrating an operation control procedure for the authentication system of FIG. 1.

FIG. 3 is a flowchart illustrating an operation control procedure for the authentication system according to the present embodiment. In step S301 in FIG. 3, whether communication-request information has been sent from the user's terminal 1 to the information source 2 is repeatedly determined until it is sent. When the communication-request information is sent, it is determined in the next step S302 whether authentication is required by the information source 2. When it is determined that authentication is required, the authentication information 8 is sent to the user's terminal 1 in the next step S303. The authentication information 8 is transferred to the card reader 4 connected to the user's terminal 1 in the next step S304. In step S305, whether the user's card 5 has been loaded into the card reader 4 is checked. When the user's card 5 has been loaded into the card reader 4, the user's card 5 generates the specified response information 9 corresponding to the authentication information 8 sent from the information source 2, and the response information 9 is sent to the information source 2 through the user's terminal 1 in step S306.

In step S307, the response information 9 is verified for authentication by the information source 2, and it is determined from a table indicating the correspondence between the authentication information included in the information source 2 and the response information whether the response information 9 is unique to the user's card. When it has been confirmed that the response information is unique to the user's card, the communication-permission information 10 is sent from the information source 2 to the user's terminal 1 in step S308. Communication is enabled in step S309 and the user starts communication, and the procedure has been completed.

When it is determined by the information source 2 in step S302 that authentication is not needed, steps S303 to S308 are skipped and communication is enabled in step S309. The user starts communication and the procedure is finished.

When it is determined in step S305 that the user's card 5 is not loaded into the card reader 4, or when it is determined in step S307 that the response information is not unique to the user's card, communication is not permitted in step S310. The user cannot perform communication and the procedure is finished.

In the authentication system according to the present embodiment, the user is not authenticated unless he or she has a physical medium, that is, the card 5. Even if communicated information is monitored by a third party, since the communicated information is not used again for authentication, reliability and security are assured. In addition, authentication is promptly computed through a communication line.

Second Embodiment

A second embodiment of the present invention will be described by referring to FIGS. 4 and 5. In the first embodiment described above, the information source 2 authenticates the card 5. In contrast, an authentication source (hereinafter called a card authentication source) on a communication line, which is different from the information source, authenticates the card in the second embodiment.

Figure 4:
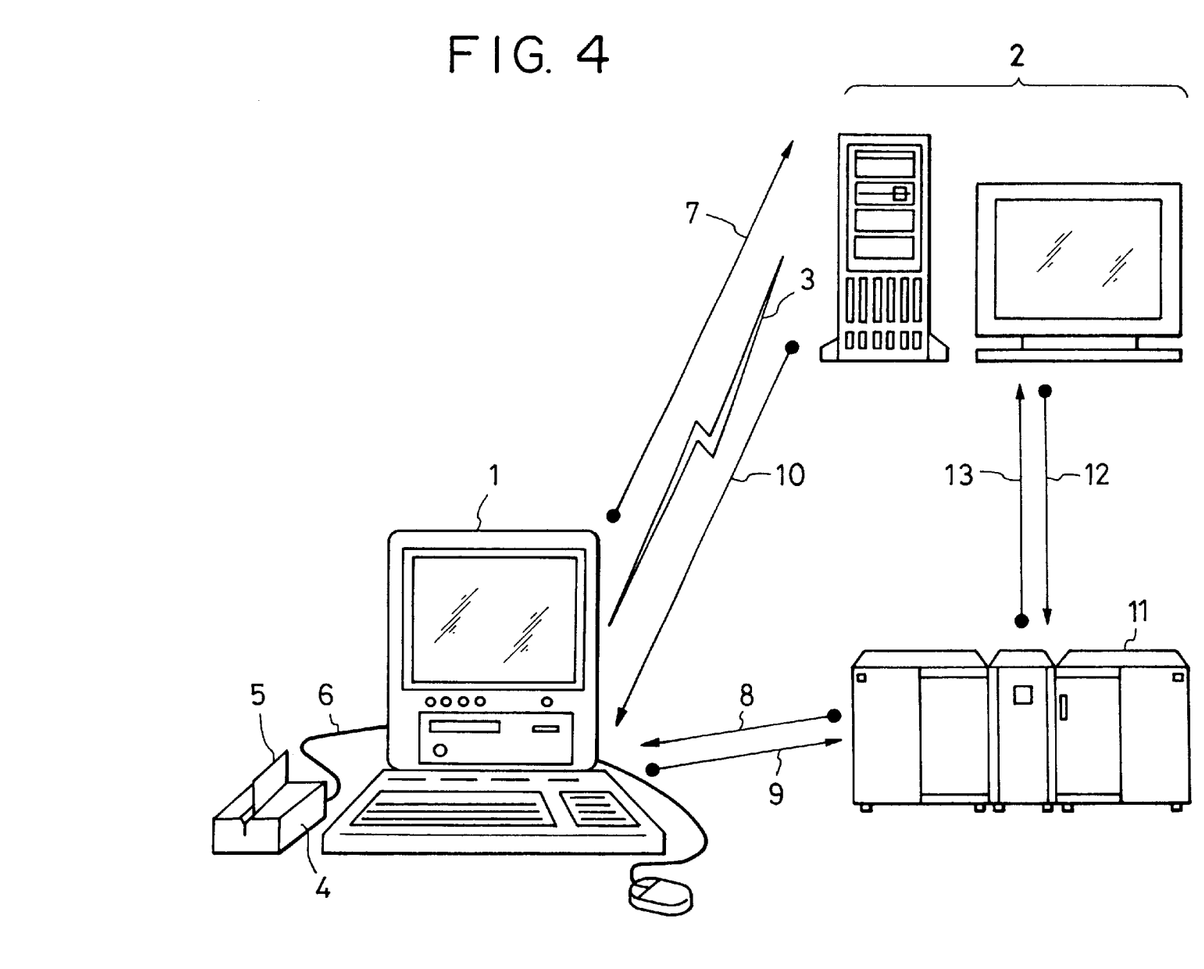
FIG. 4 is a view showing a configuration of an authentication system according to a second embodiment of the present invention.

FIG. 4 shows a configuration of an authentication system according to the second embodiment of the present invention. In FIG. 4, the same numbers as those used in FIG. 1 are assigned to the same portions as those in the first embodiment shown in FIG. 1. The authentication system shown in FIG. 4 differs from that shown in FIG. 1 in that a card authentication source 11 is added to the configuration shown in FIG. 1.

In FIG. 4, when the information source 2 receives the communication-request information 7 sent from the user's terminal 1, the information source 2 sends information such as the communication address and the user name of the user's terminal 1 to the card authentication source 11 and asks authentication 12 for the user. When the card authentication source 11 receives the authentication request 12, it sends the authentication information 8 to the user's terminal 1. In the same way as in the first embodiment described above, the user's card 5 generates the specified response information 9 corresponding to the authentication information 8 and sends it to the card authentication source 11 through the user's terminal 1. When the response information 9 is authenticated, authentication-completion information 13 is sent to the information source 2. Then, the user can communicate with the information source 2.

Figure 5:
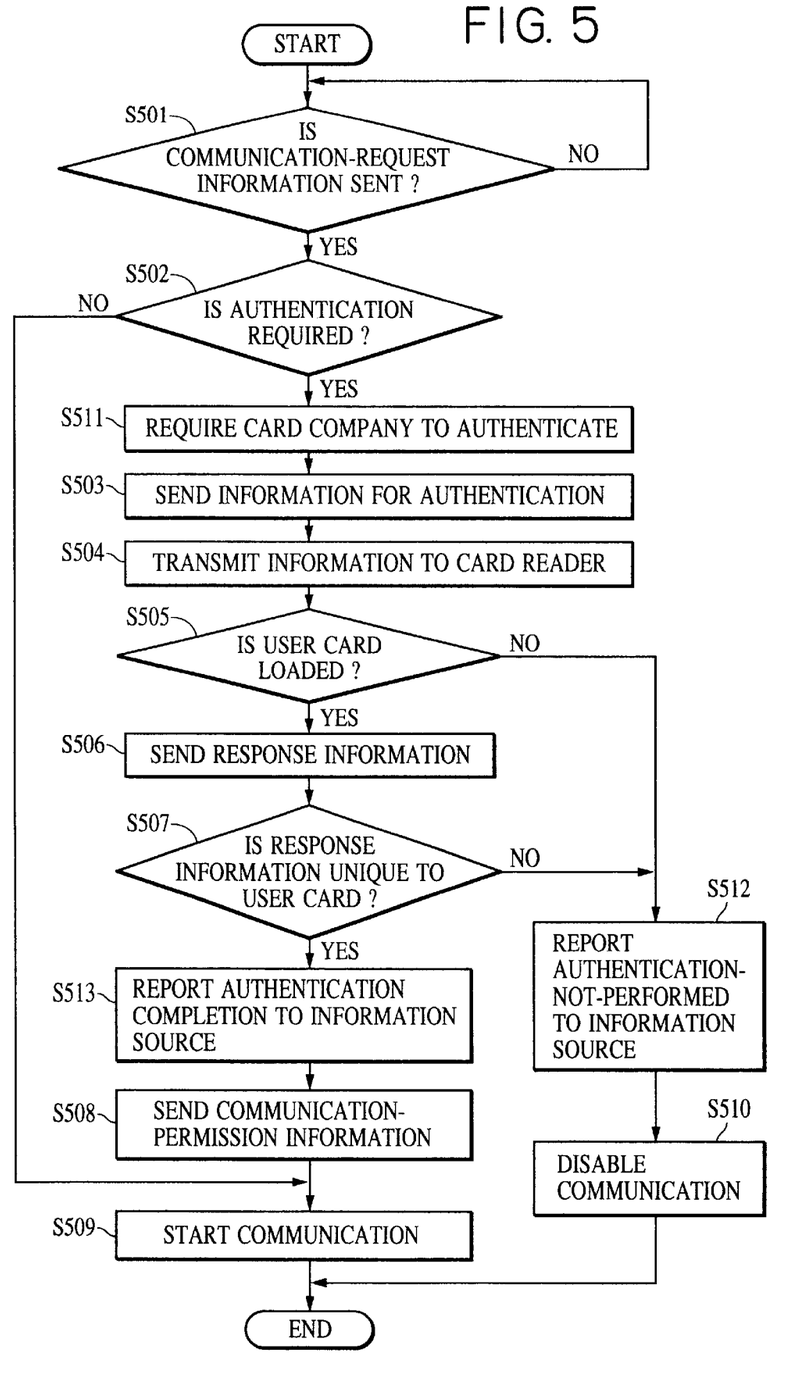
FIG. 5 is a flowchart illustrating an operation control procedure for the authentication system.

FIG. 5 is a flowchart indicating an operation control procedure for an authentication system according to the present embodiment. Since steps S501 to S510 in FIG. 5 are the same as steps S301 to S310 for the first embodiment shown in FIG. 3, respectively, the description thereof will be omitted. Only steps special to the present embodiment will be described.

In FIG. 5, when it is determined in step S502 that authentication is required, authentication is required to a card company, which is the card authentication source 11, in step S511, and the authentication information 8 is sent to the user's terminal 1 in step S503. When it is determined in step S505 that the user's card 5 is not loaded into the card reader 4, authentication-not-performed information is sent to the information source 2 in step S512, and communication is disabled in step S510. When it is confirmed in step S507 that the response information is unique to the user's card, authentication-completion report information is sent to the information source 2 in step S513 and the information source 2 sends the communication-permission information 10 to the user's terminal 1 in step S508.

Since the other configuration and the other operations in the present embodiment are the same as those described in the first embodiment, the description thereof will be omitted.

In the authentication system according to the present invention, since another company authenticates the card user, on-line money settlement by use of a credit card can be done with security.

Third Embodiment

A third embodiment of the present invention will be described below by referring to FIGS. 6 and 7. A method for generating a response signal corresponding to information input by a card can be changed in the present embodiment.

Since a basic configuration of an authentication system according to the present embodiment is the same as that in the first embodiment shown in FIG. 1, the present embodiment will be described by referring to FIG. 1.

Figure 6:
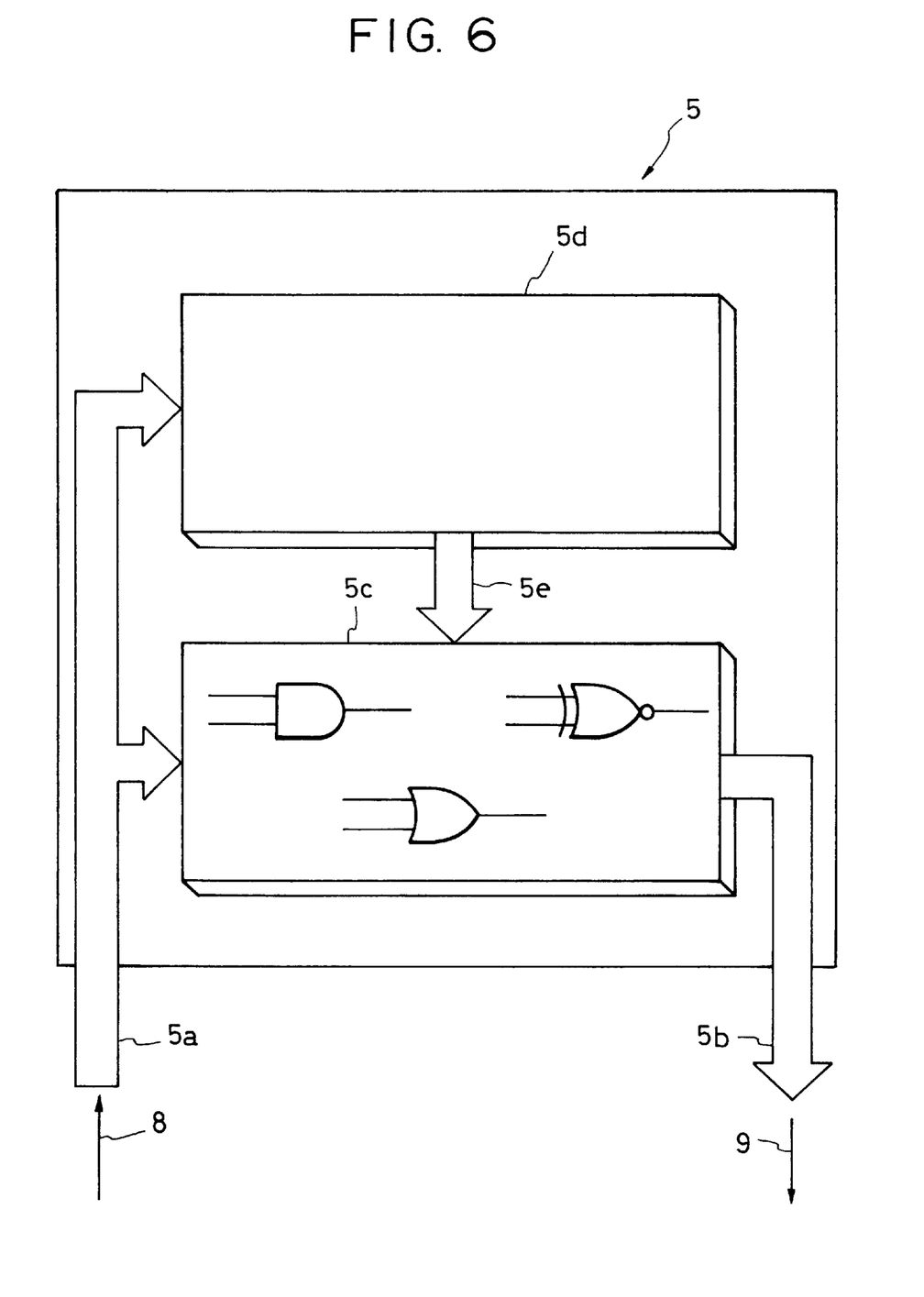
FIG. 6 is a block diagram showing an internal configuration of a card used for an authentication system according to a third embodiment of the present invention.

FIG. 6 is a block diagram indicating an internal configuration of a card used for the authentication system according to the present embodiment. In FIG. 6, the same symbols as in FIG. 2 are assigned to the same portions as those described in the first embodiment.

In FIG. 6, the authentication information 8 input to an input port 5a is input to a conversion table 5c and flash memory 5d. Information of the flash memory 5d is input to the conversion table 5c through an output port 5e. The logical calculation result in the conversion table 5c is output from an output port 5b as a response signal 9.

The contents of the flash memory can be changed. New information and a write control signal are sent through the input port 5a to change the contents. With this configuration, a method for creating a response signal 9 corresponding to the authentication information 8, which is information input by the card 5, can be changed.

Figure 7:
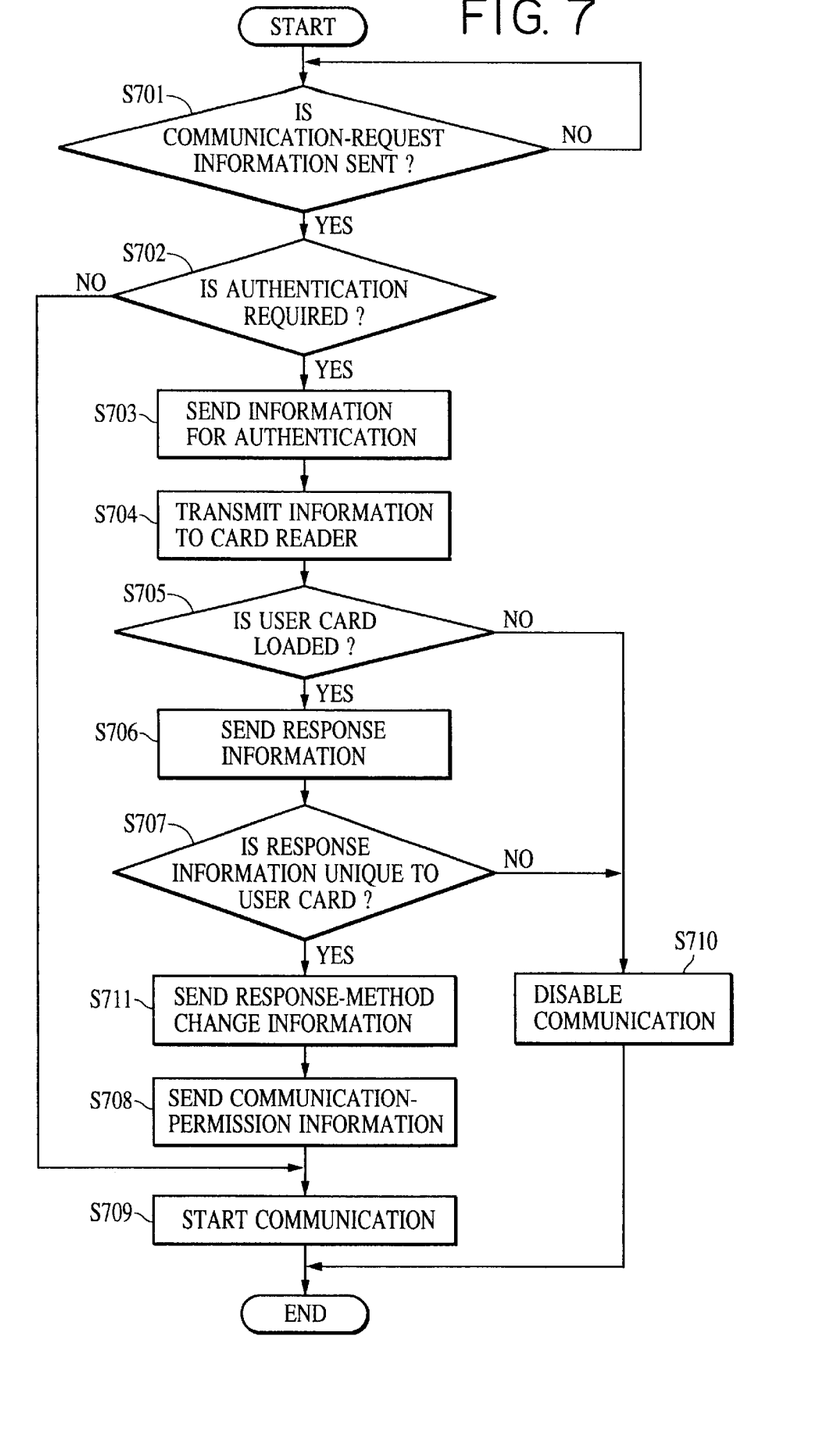
FIG. 7 is a flowchart indicating an operation control procedure for the authentication system of the third embodiment.

FIG. 7 is a flowchart indicating an operation control procedure of the authentication system according to the present embodiment. Since steps S701 to S710 in FIG. 7 are the same as steps S301 to S310 shown in FIG. 3 for the first embodiment, respectively, the description thereof will be omitted. Only steps special to the present embodiment will be described.

In FIG. 7, it is determined in step S707 from a table indicating the relationship between authentication information in the information source 2 and response information whether the response information 9 is unique to the user's card 5. When it is determined that the response information is unique to the user, response-method change information is sent in step S711 and communication-permission information is sent in step S708.

Since the other configuration and the other operations in the authentication system according to the present embodiment are the same as those in the first embodiment, the description thereof will be omitted.

In the authentication system according to the present embodiment, the response information 9 is different at every authentication although the authentication information 8, which is input to the card 5, is the same. Therefore, even if a response of the card 5 is decrypted, reliability is assured because the response is no longer used. Since the conversion method is changed after the card 5 is made, cards 5 can be manufactured with the same internal structure.

Fourth Embodiment

A fourth embodiment of the present invention will be described below by referring to FIG. 8. A card itself is provided with communication means for directly communicating with the user's terminal in this embodiment.

Since a basic configuration of an authentication system according to the present embodiment is the same as that of the first embodiment shown in FIG. 1, the present embodiment will be described by referring to FIG. 1.

Figure 8:
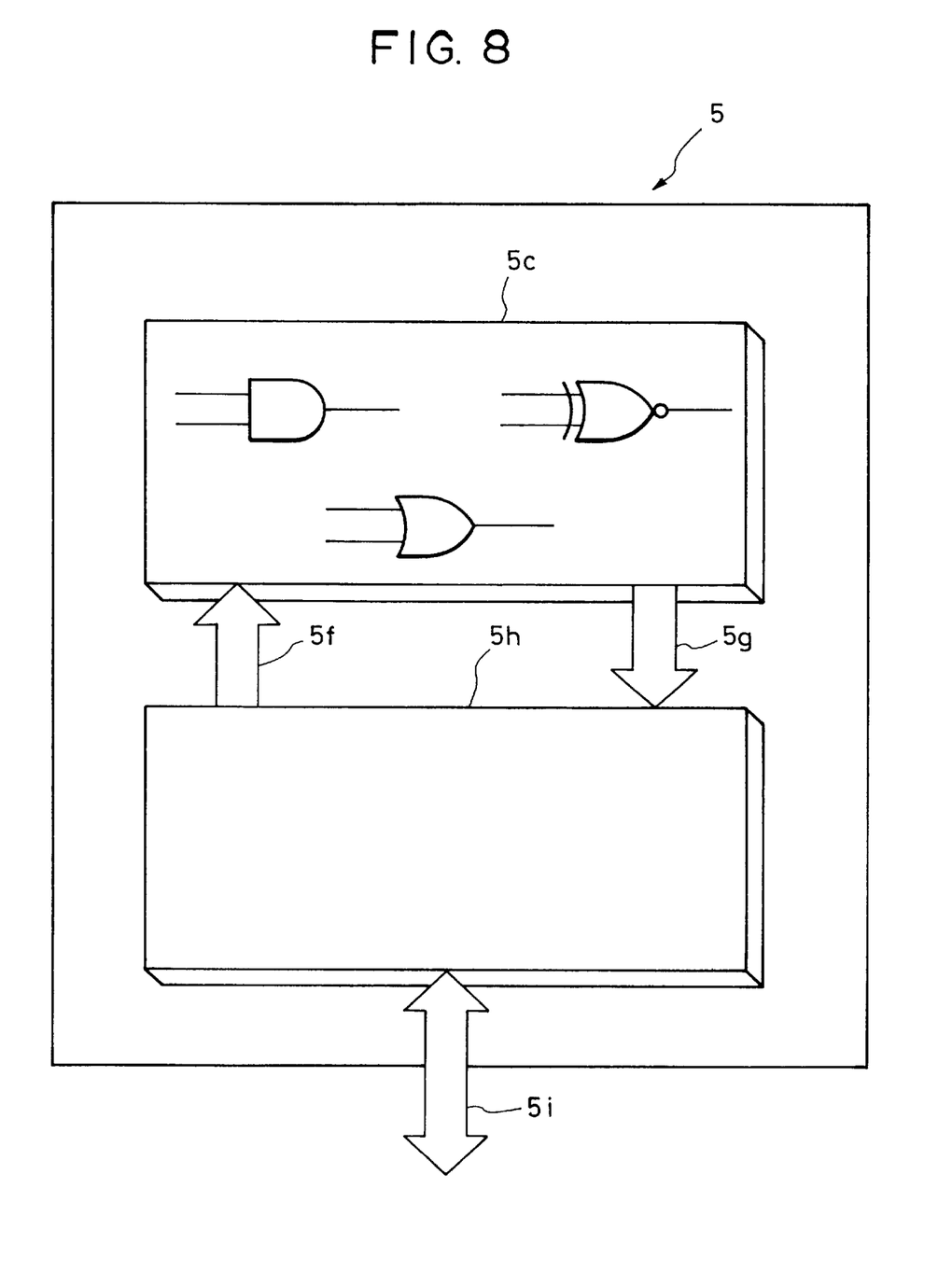
FIG. 8 is a block diagram showing an internal configuration of a card used for an authentication system according to a fourth embodiment of the present invention.

FIG. 8 is a block diagram indicating an internal configuration of a card used for the authentication system according to the present embodiment. In FIG. 8, the same symbols as those used in FIG. 2 for the first embodiment are assigned to the same portions as those in FIG. 2.

As indicated in FIG. 8, the card reader 4 is omitted and the authentication information 8 is input directly to an optical communication controller 5h of the card 5 through an optical communication input/output port 5i. The information of the optical communication controller 5h is input to a conversion table 5c through an input port 5f. The information of the conversion table 5c is input to the optical communication controller 5h through an output port 5g. The optical communication controller 5h outputs information 9 to communication source 2 through the optical communication input/output port 5i.

Since the configuration and the operations in the authentication system according to the present embodiment are the same as those in the first embodiment, the description thereof will be omitted.

In the authentication system according to the present embodiment, the card user can be authenticated without loading the card into the card reader 4 or connecting the card reader 4 to the user's terminal 1.

As described above in detail in the authentication methods and the authentication systems according to the first to fourth embodiments of the present invention, the user cannot be authenticated unless a physical information medium of the user, such as a card, is provided. Even if communicated information is monitored by a third party, since the communicated information is no longer used for authentication, reliability and security are assured. In addition, since authentication is finished through a communication line, it is prompt. On-line money settlement by use of a credit card can be done in security because another company authenticates the user of an information medium such as a card. Response information is different at every authentication although authentication information, which is input to an information medium such as a card, is the same. Even if a response for a card is decrypted, since the response is no longer used, reliability is assured. Since a conversion method for a card is changed after the card is made, cards can be manufactured with the same internal configuration. Further, the card user can be authenticated without loading an information medium, such as a card, into a card reader, or connecting the card reader to the user's terminal.

While particular embodiments of the invention have been shown and described, various modifications will be apparent to those skilled in the art. Therefore, it is not intended that the invention be limited to the disclosed embodiments or to the details thereof and departures may be made therefrom within the spirit and scope of the invention.

What is claimed is:

1. An electronic authentication method comprising the steps of:

inputting variable authentication information sent from an information source connected to a user's terminal through a communication path into a physical information medium unique to that user, wherein, each of the variable authentication information is stored in correspondence with respective response information in a correspondence table provided in said information source;

sending response information output from said information medium in response to said input authentication information, to said information source, wherein, said information medium outputs the respective response information in response to each of the variable authentication information; and verifying the response information output from said information medium by referring to said correspondence table.

2. An electronic authentication method comprising the steps of:

inputting variable authentication information which is sent from an authentication source required to perform authentication by an information source connected to a user's terminal through a communication path into a physical information medium unique to that user, wherein, each of the variable authentication information is stored in correspondence with respective response information in a correspondence table provided in said authentication source;

sending response information output from said information medium in response to said input authentication information, to said authentication source, wherein, said information medium outputs the respective response information in response to each of the variable authentication information; and verifying the response information output from said information medium by referring to said correspondence table.

3. An electronic authentication method according to claim 1 or claim 2, wherein said user's terminal is a personal computer.

4. An electronic authentication method according to claim 1 or claim 2, wherein said information medium includes storage means in which the storage contents can be rewritten.

5. An electronic authentication method according to claim 1 or claim 2, wherein said information medium includes communication means for communicating with said user's terminal using light.

6. An electronic authentication method according to claim 4, wherein said information medium includes communication means for communicating with said user's terminal using light.

7. An electronic authentication method according to claim 1 or claim 2, wherein said information medium is a memory card.

8. An electronic authentication method according to claim 4, wherein said information medium is a memory card.

9. An electronic authentication method according to claim 5, wherein said information medium is a memory card.

10. An electronic authentication system comprising:

a user's terminal;

an information source connected to said user's terminal through a communication path; and a physical information medium which is unique to that user and to which variable authentication information sent from said information source is input, wherein, each of the variable authentication information is stored in correspondence with respective response information in a correspondence table provided in said information source, wherein response information output from said information medium in response to said input authentication information is sent to said information source, wherein said information medium outputs the respective response information in response to each of the variable authentication information, and wherein the response information output from said information medium is verified by referring to said correspondence table.

11. An electronic authentication system comprising:

a user's terminal;

an information source connected to said user's terminal through a communication path;

a physical information medium which is unique to that user and to which variable authentication information sent from said information source is input; and an authentication source connected to said user's terminal and said information source through communication means, wherein, each of the variable authentication information is stored in correspondence with respective response information in a correspondence table provided in said information authentication source, and wherein response information output from said information medium in response to said input authentication information is sent to said authentication source, wherein said information medium outputs the respective response information in response to each of the variable authentication information and is verified by referring to said correspondence table.

12. An electronic authentication system according to claim 10 or claim 11, wherein said user's terminal is a personal computer.

13. An electronic authentication system according to claim 10 or claim 11, wherein said information medium includes storage means in which the storage contents can be rewritten.

14. An electronic authentication system according to claim 10 or claim 11, wherein said information medium includes communication means for communicating with said user's terminal using light.

15. An electronic authentication system according to claim 13, wherein said information medium includes communication means for communicating with said user's terminal using light.

16. An electronic authentication system according to claim 10 or claim 11, wherein said information medium is a memory card.

17. An electronic authentication system according to claim 13, wherein said information medium is a memory card.

18. An electronic authentication system according to claim 14, wherein said information medium is a memory card.

19. An electronic authentication method comprising:

a sending step for sending variable authentication information from an information source terminal to a user's terminal, wherein, each of the variable authentication information is stored in correspondence with respective response information in a correspondence table provided in said information source;

an input step for inputting said variable authentication information received by said user's terminal into an information medium loaded into said user's terminal;

a receiving step for receiving response information in response to said input authentication information from said user's terminal to said information source terminal, wherein said information medium outputs the respective response information in response to each of the variable authentication information;

a determination step for determining whether the response information received by said information source terminal is valid by referring to said correspondence table; and a decision step for deciding according to a result of the determination whether said information source terminal permits access from said user's terminal.

20. An electronic authentication method according to claim 19, further comprising, prior to the sending step for sending variable authentication information, a sending step for sending communication-request information requesting transfer of the authentication information, from said user's terminal to said information source terminal.

21. An electronic authentication method comprising:

a first sending step for sending authentication request information for a user's terminal from an information source terminal to an authentication terminal;

a second sending step for sending variable authentication information from said authentication terminal to said user's terminal, wherein, each of the variable authentication information is stored in correspondence with respective response information in a correspondence table provided in said authentication terminal;

an input step for inputting said variable authentication information received by said user's terminal into an information medium loaded in said user's terminal;

a third sending step for sending response information in response to said input authentication information from said user's terminal to said authentication terminal, wherein said information medium outputs the respective response information in response to each of the variable authentication information;

a determination step for determining whether said response information received by said authentication terminal is valid by referring to said correspondence table;

a fourth sending step for sending a result of the determination from said authentication terminal to said information source terminal; and a decision step for deciding according to the result of the determination whether said information source terminal permits access from said user's terminal.

22. An electronic authentication method according to claim 21, further comprising, prior to the first sending step, a fifth sending step for sending communication-request information requesting transfer of the authentication information, from said user's terminal to said information source terminal.

23. An electronic authentication system comprising an information source terminal and a user's terminal, said information source terminal including:
sending means for sending variable authentication information to said user's terminal;
storage means for storing a correspondence table of each of the variable authentication information and respective corresponding response information;
determination means for determining whether response information received from said user's terminal is valid by referring to said correspondence table; and
decision means for deciding whether access from said user's terminal is permitted according to a result of the determination, and said user's terminal including:
loading means for loading an information medium;
input means for inputting said variable authentication information into an information medium loaded into said loading means; and
sending means for sending response information in response to said variable authentication information input from said information medium, to a said information source terminal, wherein said information medium outputs the respective response information in response to each of the variable authentication information.

24. An electronic authentication system according to claim 23, wherein said user's terminal further includes third sending means for sending to said information source terminal communication-request information requesting transfer of the authentication information.

25. An electronic authentication system comprising an information source terminal, a user's terminal, and an authentication terminal, said information source terminal including:
sending means for sending authentication request information for said user's terminal to said authentication terminal; and
decision means for deciding whether said information source terminal permits access from said user's terminal according to a result of a determination of whether response information of said user's terminal received from said authentication terminal is valid, said authentication terminal including:
first sending means for sending variable authentication information to said user's terminal;
storage means for storing a correspondence table of each of the variable authentication information and respective corresponding response information;
determination means for determining whether response information received from said user's terminal is valid by referring to said correspondence table; and
second sending means for sending a result of the determination to said information source terminal, and said user's terminal including:
loading means for loading an information medium;
input means for inputting said variable authentication information into an information medium loaded into said loading means; and
sending means for sending response information in response to said variable authentication information input from said information medium, to said authentication terminal, wherein said information medium outputs the respective response information in response to each of the variable authentication information.

26. An electronic authentication system according to claim 25, wherein said user's terminal further includes fifth sending means for sending to said information source terminal, communication-request information requesting transfer of the authentication information.

27. Computer executable process code stored in a computer-readable medium to be provided in an information source terminal, said medium comprising;

code to send variable authentication information to a user's terminal for inputting said variable authentication information into an information medium loaded into said user's terminal, wherein, each of the variable authentication information is stored in correspondence with respective response information in a correspondence table provided in said information source;

code to receive response information output from said information medium in response to said input authentication information, from said user's terminal, wherein said information medium outputs the respective response information in response to each of the variable authentication information;

code for determining whether the response information received by said information source terminal is valid by referring to said correspondence table; and     code for deciding according to a result of the determination whether said information terminal permits access from said user's terminal.

28. Computer executable process code stored in a computer-readable medium according to claim 27, further comprising code to execute sending communication-request information requesting transfer of the authentication information, from said user's terminal to said information source terminal.

29. Computer executable process code stored in a computer-readable medium comprising:

code to send authentication-request information for a user's terminal from an information source terminal to an authentication terminal;

code to send variable authentication information from said authentication terminal to said user's terminal, wherein, each of the variable authentication information is stored in correspondence with respective response information in a correspondence table in said authentication terminal;

code for inputting said variable authentication information received by said user's terminal into an information medium loaded in said user's terminal;

code to send response information in response to said input variable authentication information from said user's terminal to said authentication terminal, wherein said information medium outputs the respective response information in response to each of the variable authentication information;

code for determining whether said response information received by said authentication terminal is valid by referring to said correspondence table;

code to send a result of the determination from said authentication terminal to said information source terminal; and     code for deciding according to said result of the determination whether said information source terminal permits access from said user's terminal.

30. Computer executable process code stored in a computer-readable medium according to claim 29, further comprising code to execute sending communication-request information requesting transfer of the authentication information, from said user's terminal to said information source terminal.

\* \* \* \* \*